United States Patent
Satish et al.

(10) Patent No.: US 12,074,901 B1
(45) Date of Patent: Aug. 27, 2024

(54) SECURITY ACTION VERIFICATION IN A COMPUTING NETWORK

(71) Applicant: Splunk Inc., San Francisco, CA (US)

(72) Inventors: Sourabh Satish, Fremont, CA (US);
Oliver Friedrichs, Woodside, CA (US);
Atif Mahadik, Fremont, CA (US);
Govind Salinas, Sunnyvale, CA (US)

(73) Assignee: Splunk Inc., San Francisco, CA (US)

( * ) Notice: Subject to any disclaimer, the term of this patent is extended or adjusted under 35 U.S.C. 154(b) by 4 days.

(21) Appl. No.: 18/177,620

(22) Filed: Mar. 2, 2023

Related U.S. Application Data (63) Continuation of application No. 15/170,605, filed on Jun. 1, 2016, now abandoned.

(60) Provisional application No. 62/169,047, filed on Jun. 1, 2015.

(51) Int. Cl.
*H04L 9/40* (2022.01)
*G06F 21/57* (2013.01)

(52) U.S. Cl.
CPC .......... *H04L 63/1433* (2013.01); *H04L 63/14* (2013.01); *H04L 63/1441* (2013.01); *H04L 63/20* (2013.01); *G06F 21/577* (2013.01)

(58) Field of Classification Search
CPC ............... H04L 63/1433; H04L 63/14; H04L 63/1441; H04L 63/20; H04L 9/002; G06F 21/577
See application file for complete search history.

(56) References Cited

U.S. PATENT DOCUMENTS

| | | | |
|---|---|---|---|
| 8,042,178 B1 | 10/2011 | Fisher et al. | |
| 8,214,904 B1 * | 7/2012 | Doukhvalov | G06Q 10/00 726/26 |
| 8,611,544 B1 * | 12/2013 | Herbach | H04L 63/10 380/279 |
| 9,087,187 B1 * | 7/2015 | Doane | H04L 9/3236 |
| 2002/0169986 A1 | 11/2002 | Lortz | |
| 2003/0023850 A1 * | 1/2003 | Brown | H04L 12/1831 713/176 |
| 2007/0101433 A1 | 5/2007 | Louch et al. | |
| 2008/0141339 A1 | 6/2008 | Gomez et al. | |
| 2010/0011408 A1 | 1/2010 | Bhattacharyya et al. | |

(Continued)

OTHER PUBLICATIONS

Thejaka Kanewala et al. A Credential Store for Multi-tenant Science Gateways, 2014, pp. 445-454. (Year: 2014).*
Antonia Bertolina et al., Enhancing service Federation Trustworthiness through Online Testing, 2012, pp. 66-72. (Year: 2012).*

(Continued)

*Primary Examiner* — Luu T Pham
*Assistant Examiner* — Canh Le
(74) *Attorney, Agent, or Firm* — Nicholson De Vos Webster & Elliott LLP (57) ABSTRACT

Systems, methods, and software described herein provide for validating security actions before they are implemented in a computing network. In one example, a computing network may include a plurality of computing assets that provide a variety of different operations. During the operations of the network, administration systems may generate and provide security actions to prevent or mitigate the effect of a security threat on the network. However, prior to implementing the security actions within the network, computing assets may exchange security parameters with the administration systems to verify that the security actions are authentic.

20 Claims, 8 Drawing Sheets

(56) References Cited

U.S. PATENT DOCUMENTS

| | | | |
|---|---|---|---|
| 2010/0174812 A1* | 7/2010 | Thomas | G06F 21/305 |
| | | | 709/224 |
| 2011/0296499 A1 | 12/2011 | Knjazihhin et al. | |
| 2014/0373151 A1 | 12/2014 | Webb et al. | |
| 2015/0006184 A1 | 1/2015 | Marti et al. | |
| 2015/0033031 A1* | 1/2015 | Swaminathan | G06F 21/10 |
| | | | 713/187 |
| 2015/0101030 A1* | 4/2015 | Maret | H04L 63/20 |
| | | | 726/5 |
| 2015/0150130 A1 | 5/2015 | Fiala et al. | |
| 2016/0019043 A1 | 1/2016 | Ramasamy | |
| 2016/0080334 A1* | 3/2016 | Hamilton | H04L 63/10 |
| | | | 713/168 |
| 2016/0182566 A1 | 6/2016 | Bean et al. | |
| 2016/0188875 A1* | 6/2016 | Weast | G06F 21/577 |
| | | | 726/23 |
| 2017/0054744 A1* | 2/2017 | Mumcuoglu | H04L 63/1425 |
| 2019/0132358 A1* | 5/2019 | DiValentin | H04L 63/1416 |

OTHER PUBLICATIONS

Advisory Action office Action, U.S. Appl. No. 15/170,605, Jun. 25, 2020, 5 pages.

Final Office Action, U.S. Appl. No. 15/170,605, Mar. 11, 2020, 15 pages.

Final Office Action, U.S. Appl. No. 15/170,605, Jan. 26, 2021, 18 pages.

Non-Final Office Action, U.S. Appl. No. 15/170,605, Sep. 4, 2019, 16 pages.

Non-Final Office Action, U.S. Appl. No. 15/170,605, Jul. 22, 2020, 17 pages.

Non-Final Office Action, U.S. Appl. No. 15/170,605, Oct. 4, 2017, 24 pages.

Final Office Action, U.S. Appl. No. 15/170,605, Apr. 25, 2018, 28 pages.

Non-Final Office Action, U.S. Appl. No. 15/170,605, Dec. 5, 2018, 21 pages.

Non-Final Office Action, U.S. Appl. No. 15/170,605, Mar. 27, 2019, 16 pages.

* cited by examiner

FIGURE 8

SECURITY ACTION VERIFICATION IN A COMPUTING NETWORK

CROSS-REFERENCED TO RELATED APPLICATIONS

This application claims benefit under 35 U.S.C. § 120 as a continuation of U.S. application Ser. No. 15/170,605, filed Jun. 1, 2016, which application claims priority to U.S. Provisional Patent Application No. 62/169,047, entitled "SECURITY ACTION VERIFICATION IN A COMPUTING NETWORK", filed Jun. 1, 2015, which is hereby incorporated by reference in its entirety for all purposes.

TECHNICAL FIELD

Aspects of the disclosure are related to computing environment security, and in particular to verifying security actions prior to implementation in a computing network.

TECHNICAL BACKGROUND

An increasing number of data security threats exist in the modern computerized society. These threats may include viruses or other malware that attacks the local computer of the end user, or sophisticated cyber-attacks to gather data and other information from the cloud or server based infrastructure. This server based infrastructure includes real and virtual computing devices that are used to provide a variety of services to user computing systems, such as data storage, cloud processing, web sites and services, amongst other possible services. To protect applications and services, various antivirus, encryption, and firewall implementations may be used across an array of operating systems, such as Linux and Microsoft Windows.

In some implementations, security actions may be implemented by an administration system for the computing environment or network. This administration system may be responsible for identifying a threat, determining an appropriate action for the threat, and providing the security action to the computing environment. However, although administration systems may provide actions to prevent or mitigate the effects of a security threat, improper security actions from non-approved sources may cripple the functionality of the network, and possibly open paths for future security threats.

Overview

The technology disclosed herein provides enhancements for verifying security actions before they are implemented in a computing network. In one implementation, a method of implementing security actions in a computing network with a plurality of computing assets includes, in an administration system, identifying a security action to be implemented in at least one computing asset of the computing network. The method further provides, in response to identifying the security action, exchanging, between the administration system and the at least one computing asset, security parameters for the security action. The method also includes, in the at least one computing asset, determining whether the security action is approved for the at least one computing asset based on the security parameters and, if the security action is approved, initiating implementation of the security action.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

The various examples disclosed herein provide for verifying a security action before it can be implemented within a computing network. In particular, computing networks, such as those used for corporations, partnerships, and other similar organizations, include a variety of computing assets to provide desired operations. These computing assets may include end user computing systems, serving computing systems, virtual machines, firewalls, routers, switches, and other similar computing assets. During operation of the computing assets, security threats may be encountered that limit or otherwise hinder the operation of the network as a whole. Accordingly, an administrator or an automated process associated with the network may be configured to identify security actions to be taken in the environment, and initiate implementation of the actions within the appropriate computing assets.

Here, the actions that are to be implemented within a computing network are required to be verified before they can be applied to the computing assets. By verifying an action prior to implementation, only actions that have proper credentials may be applied to the system, limiting the possibility of a crippling action to the computing environment. In particular, an administration system associated with the computing network may be configured to identify a security action to be implemented in one or more of the assets of the network. Once the action is identified, assets associated with the action may be notified of the action, and security parameters or credentials may be exchanged between the administration system and the one or more assets to verify the security action. After the security action is verified, the action may be implemented within the network.

In some implementations, in exchanging the security credentials with the assets associated with the threat, the administration system may be configured to receive credentials, such as a username and password, associated with the particular asset. Once received, the credentials may be supplied to the asset, where the asset may determine whether the credentials are appropriate for the asset. If the credentials are appropriate, the asset may initiate application of the security action, however, if the credentials are not appropriate, the asset may block or prevent the action from being implemented on the asset. In some implementations, in blocking the implementation of the action, the asset may also transfer a notification to the administration system indicating that the credentials were not accepted. By requiring credentials for each of the assets being applied with a security action, limited personnel with credentials may implement security actions on particular assets. Further, rather than maintaining credentials in a centralized location, such as the administration system, the administrators may rely on the end assets to maintain credential verification for each of the security actions.

Figure 1:
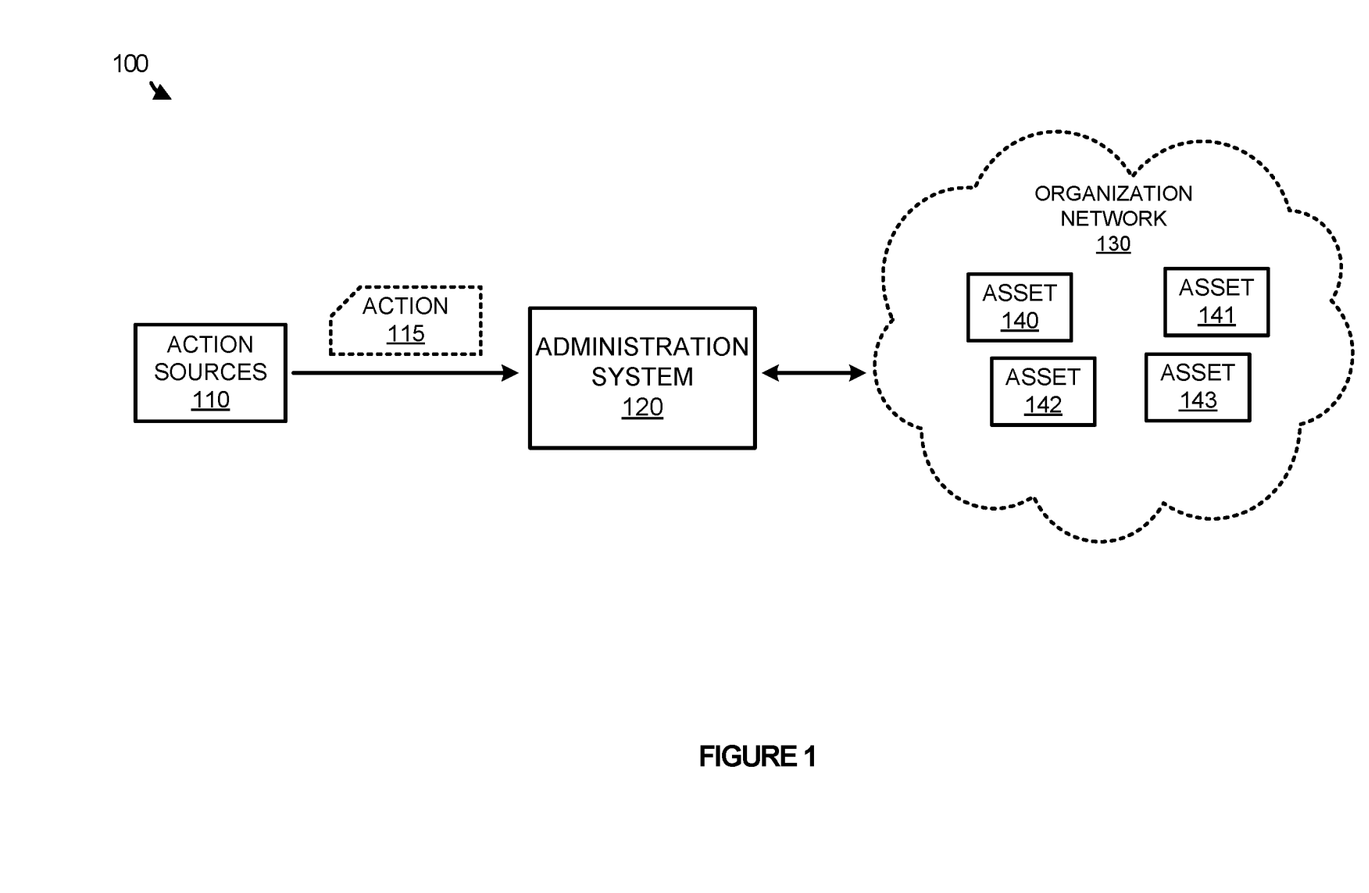
FIG. 1 illustrates a system to verify security actions prior to implementing the security actions in a computing network according to one implementation.

Referring now to FIG. 1, FIG. 1 illustrates a system 100 to verify security actions prior to implementing the security actions in a computing network according to one implementation. System 100 includes action sources 110, administration system 120, and organization network 130. Organization network 130 includes assets 140-143, which may comprise end user computing systems, serving computing systems, virtual machines, routers, switches, firewalls, or any other similar computing asset, including combinations thereof. Although illustrated with four computing assets in the present example, it should be understood that any number of computing assets may be implemented within a computing network.

In operation, computing assets 140-143 provide various operations for an organization. During the operation of the computing assets, the assets may be subjected to security threats from various sources, which may include viruses, denial of service attacks, data retrieval attacks, ransomware attacks, or any other similar security threat. To counteract the threat, administration system 120 may be communicatively coupled to organization network 130, allowing an administrator or an automated process to implement security actions limiting the effect of security threats within the environment. However, although the security actions are created to assist in eliminating security threats, improper security actions may limit the operations of organization network 130, or leave the network open to other security threats.

Here, administration system 120 receives or identifies action 115 from action sources 110. This action may include an action to block a particular internet protocol (IP) address, to remove a particular process from one or more assets, to segregate one or more assets from other assets in the environment, or any other security action for a computing network. Action 115 may be specified by an administrator of organization network, may be retrieved from a database of actions available to administration system 120, may be generated in response to identifying a threat in the network by administration system 120, or may be generated in any other manner. Once the action is specified, administration system 120 will notify the required assets of the upcoming security action, authenticate the security action, and implement the action within the network.

Figure 2:
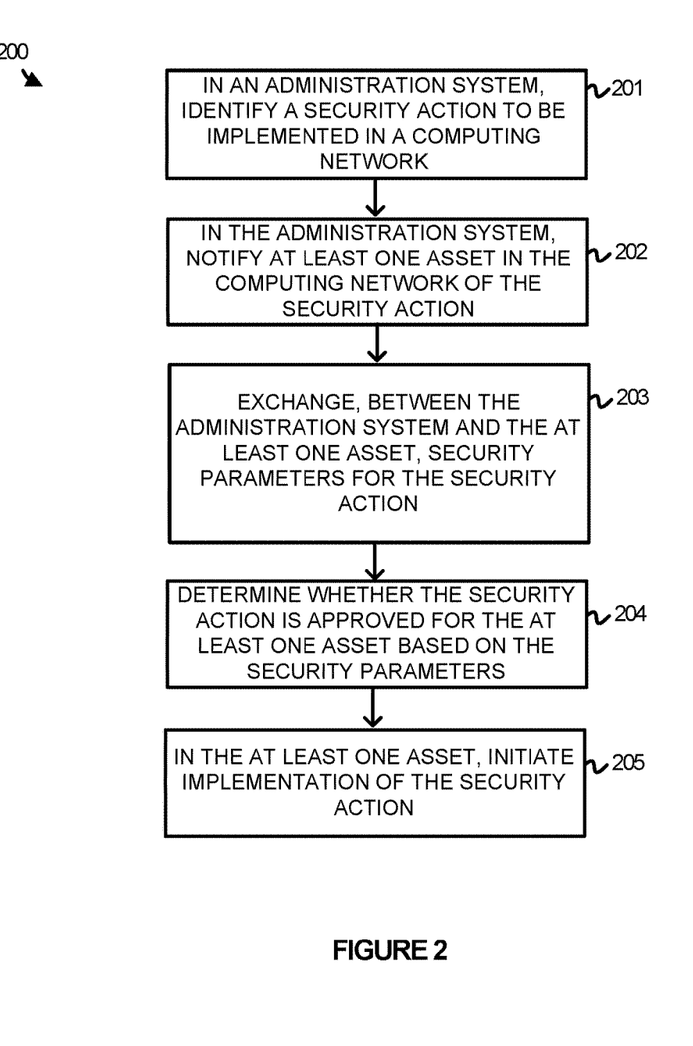
FIG. 2 illustrates a method of verifying security actions prior to implementing the security actions in a computing network according to one implementation.

To further demonstrate the operation of system 100, FIG. 2 is provided. FIG. 2 illustrates a method 200 of verifying security actions prior to implementing the security actions in a computing environment. As depicted, method 200 includes, in administration system 120, identifying security action 115 to be implemented in organization network 130 (201). This security action may be generated by an administrator for the network, may be retrieved from a database of security actions, may be generated by an automated process in response to a threat (in some cases by administration system 120), or may be generated in any other similar manner. Once the security action is identified, administration system 120 notifies at least one asset in the computing network of the security action (202). For example, the security action may include blocking a particular IP address from accessing all assets within organization network 130. Accordingly, administration system 120 may transfer a notification to assets 140-143 informing the assets that an action is desired.

In addition to, and in some cases in place of, notifying the assets of the impending security action, method 200 further includes exchanging, between the administration system and the at least one asset, security parameters for the security action (203). Based on the security parameters, the assets may determine whether the security action is approved for the particular assets (204). In some implementations, the security exchange may include exchanging phrases or codes, which can be verified using keys on the administration system and the assets. For example, in response to being notified of a security action, the asset may generate a code and transfer the code to the administration system. Once received, the administration system may apply a key to the code to generate a response code, and transfer the response code back to the particular asset. Once received from the administration system, the asset may compare the response code with an expected result to determine whether the security action is approved for the asset. In some examples, the exchanged security parameters may include Secure Sockets Layer parameters, which is used to establish an encrypted link between two computing devices.

In another implementation, the security exchange may include the delivery of a digital signature from the administration system to the required assets. This digital signature allows the administration system to provide assurances to origin, identity, and status of the security action, and may further provide informed consent from the associated administrator. Accordingly, when an action is required within the network, an administrator at administration system 120 may select an action, generating a signature for the selection that can then be transferred with the action to the corresponding network assets. For example, if an action were to be implemented on assets 140-141, the action may be delivered to each of the assets with the requisite signature to implement the action. If an action did not include the signature, however, the assets may prevent or block the security action from being implemented in the network, and may notify the administration system that the action could not be implemented with the provided credentials.

In some examples, the delivery of the digital signature or the security parameters may include security credentials associated with the particular assets. For example, an administrator may provide username and password information for each of the assets for the security action. Once provided, the credentials may be supplied to the computing assets, and processed to determine whether the action is permitted. If permitted, the assets may initiate the implementation of the security action on the computing system. This may include configuring the security action that was provided before, during, or after the security credentials, or may include transferring a notification to the administration system requesting the security action.

Figure 3:
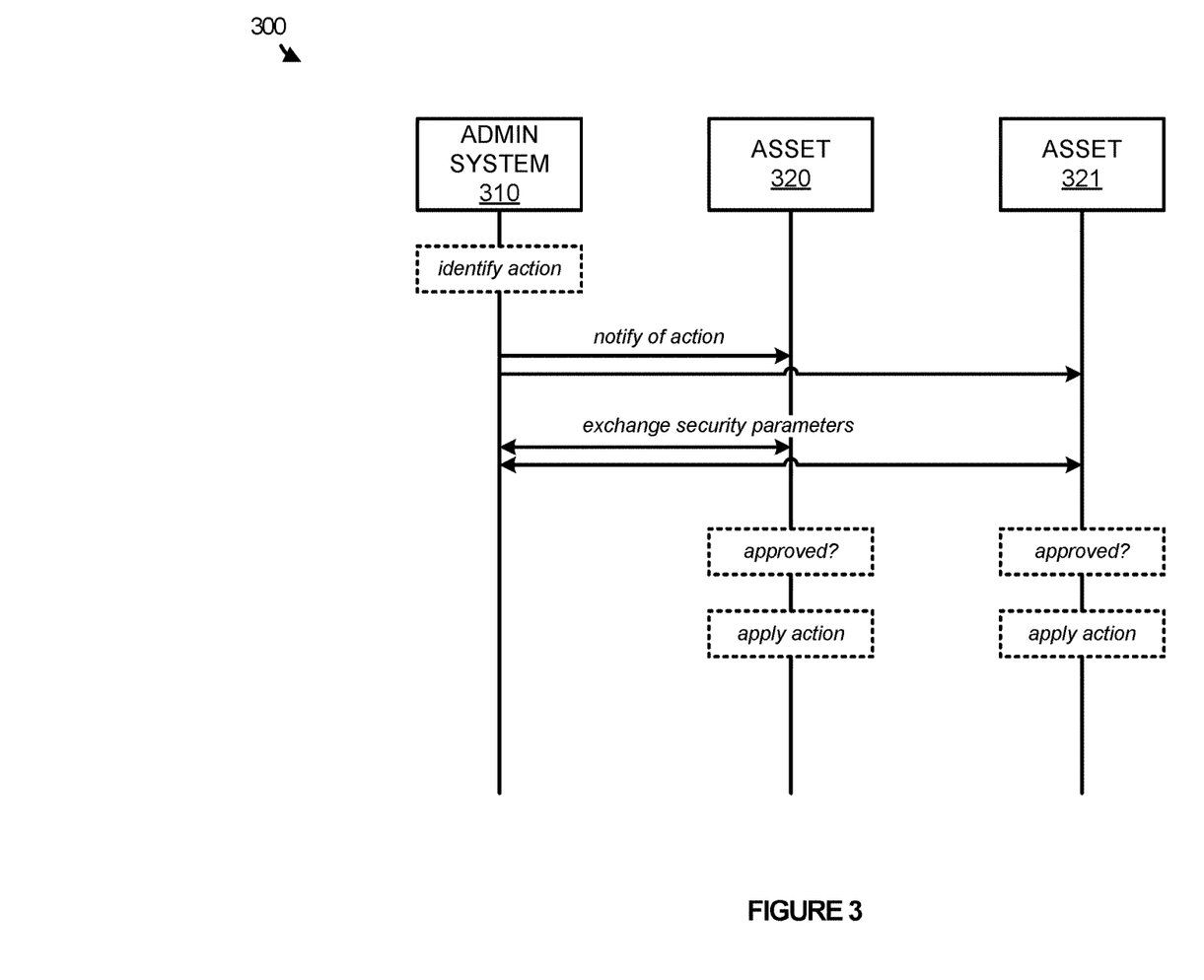
FIG. 3 illustrates a timing diagram for verifying a security action prior to implementing the security action in a computing network according to one implementation.

Turning to FIG. 3, FIG. 3 illustrates a timing diagram 300 for verifying a security action prior to implementing the security action in a computing network according to one implementation. Timing diagram 300 includes administration system 310 and assets 320-321, which are representative of assets that can be implemented within a computing network, such as an organization, corporation, and the like.

As illustrated, administration system 310 identifies a security action to be implemented in computing assets 320-321. This action may include an action to block a particular IP address, prevent access to the assets by a particular user, remove one or more processes from the assets, segregate the assets from other assets within the network, or any other similar security measure. Once the action is identified, administration system 310 notifies assets 320-321 of the security action, which may include delivering the particular security action to the assets. After notifying the assets of an impending security action, administration system 310, and computing assets 320-321 may exchange security parameters to ensure that the security action is valid. This exchange may include an SSL exchange, a security passphrase exchange, a delivery of an electronic signature to the computing assets, or any other similar exchange of security parameters to validate the action and/or the source of the action.

Based on the exchanged parameters, the assets may determine whether the particular action is approved. If the action is not approved to be implemented, no further action is required by the security assets. In contrast, if the action is approved, a process may be initiated to implement the particular action within the computing assets. For example, the action identified by administration system 310 may require that a particular process is removed from assets 320-321. Once the action is identified by administration system 310, administration system 310 may notify and exchange security parameters with the assets to verify the particular action and the identity of the approving administration device. Once verified, the action to remove the process may be implemented in the assets.

In some implementations, the security action identified by administration system 310 may comprise an action written in a unified security language for all computing assets. This unified security language may comprise Python, C, C++, or some other language that can be used to define security actions across a plurality of assets. Although the language allows actions to be taken across a plurality of assets in a computing environment, each of the assets may include a different hardware or software configuration. Consequently, the security action written in the unified security language may be required to be translated into the necessary procedures to implement the action on the individual assets. This translation may occur locally, at administration system 310, or may occur in the target computing assets. For example, a unified command for FIG. 3 may include, "block IP address X on asset 320 and asset 321." Once defined, the hardware and software characteristics for assets 320-321 may be identified, and the action may be translated into the necessary procedures for implementing the action on assets 320-321. Accordingly, the action that is transferred from the administration system to the assets may include the unified language, allowing the assets to translate the action into the appropriate processes, or may include the specific processes for the individual asset.

Figure 4:
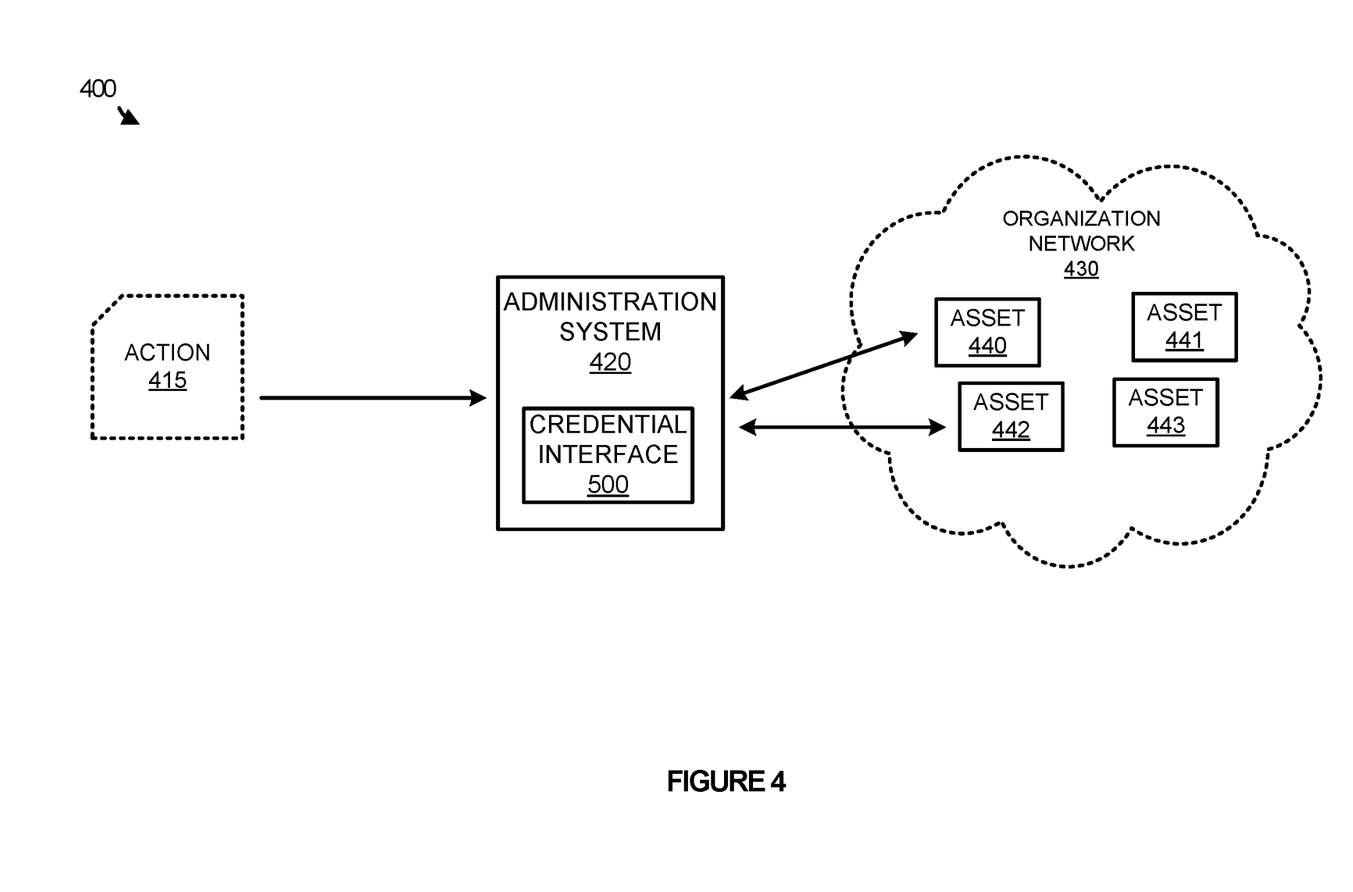
FIG. 4 illustrates a system to verify and authorize security actions prior to implementing the security actions in a computing network according to one implementation.
Figure 5:
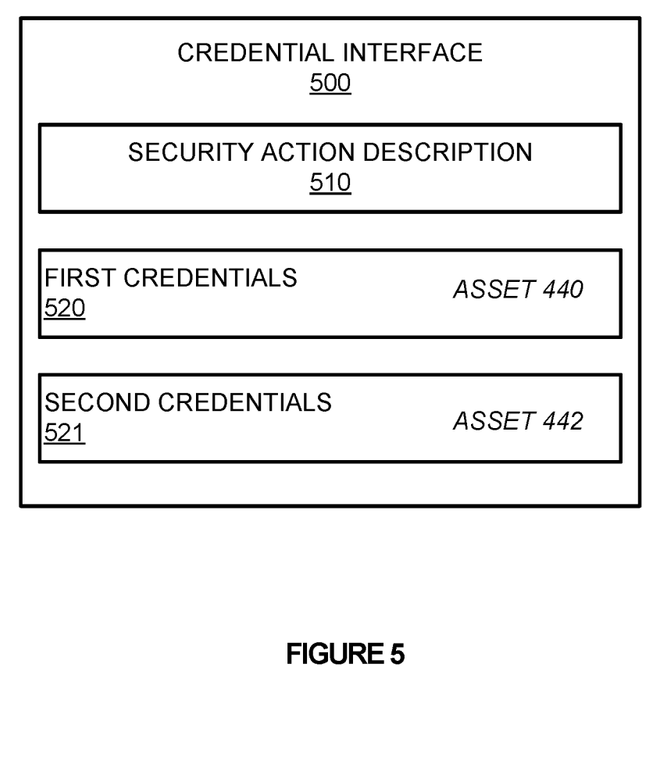
FIG. 5 illustrates a credential interface to authorize security actions prior to implementing the security actions in a computing network according to one implementation.

FIG. 4 illustrates a system 400 to verify and authorize security actions prior to implementing the security actions in a computing network according to one implementation. System 400 includes action 415, administration system 420, and organization network 430. Administration system 420 is used to provide credential interface 500, which may be provided via a user interface console to an administrator of the organization network or some other user interface element as part of administration system 420. Organization network 430 includes assets 440-443, which are representative of computing assets, such as end user computing systems, serving computing systems, virtual machines, routers, switches, firewalls, or any other similar computing asset, including combinations thereof.

As described herein, when security threats are identified within organization network 430, an administration system, such as administration system 420 is used to verify and authorize a security action to be taken against the threat. In the example of system 400, administration system 420 identifies a security action 415 to be implemented in assets 440 and 442 of organization network 430. This security action may be provided manually by the administrator, or may be automatically identified based on the type or identity of the threat in the environment.

In some implementations, action 415 may be determined by administration system 420 based on the type of threat identified within organization network. For example, if a threatening IP address were requesting communications with one or more of the assets in the environment, administration system 420 may identify the threat in the environment, and identify a security action to be taken against the threat, wherein the response may include blocking future communications from the IP address, limiting communications with the IP address, or some other similar action. In the example of blocking an IP address, administration system 420 may identify one or more firewall assets within organization network 430, and identify an appropriate action to configure the firewalls to block the corresponding IP address. Once identified, a credential interface 500 may be supplied to an administrator of the required assets, and permit the user to provide the credentials associated with the required assets.

Here, a user is provided with credential interface 500 corresponding to the credentials for asset 440 and asset 442. Once the credentials are supplied, the credentials are transferred or exchanged with assets 440 and 442, and once authorized, the security action is implemented within the appropriate assets. In some implementations, the security action may be transferred with the credentials, such that the action may be implemented once approved credentials are supplied to assets 440 and 442. In other implementations, credentials may be supplied to the asset, and the asset may notify administration system 420 whether the credentials are accepted or declined. If the credentials are accepted, administration system 420 may transfer the action operations to the asset for implementation, however, if the credentials are not accepted, the action may not be transferred, as the action cannot be implemented without the appropriate credentials.

Referring now to FIG. 5, FIG. 5 illustrates a credential interface 500 to authorize security actions prior to implementing the security actions in a computing network according to one implementation. Credential interface 500 in FIG. 5 is representative of a sample interface that may be supplied on an administration system permitting an administrator of an organization network to authorize an action before it is implemented within the environment. In the present implementation, credential interface 500 includes security action description 510, first credentials 520, and second credentials 521.

As described previously in FIG. 4, an administration system is configured to identify security threats within organization network 430. Once the security threat is identified, administration system 420, which may include one or more computing systems as well as administration consoles, may determine a security action to be taken against the threat. This action may be determined based on information, such as IP address information, URL information, process naming information, author information, or any other describing features for the threat. Further, enrichment information may be determined from one or more databases or sources (such as websites) based on the describing features, wherein the enrichment information may include information about the IP address, URL, process name, or other similar information. For example, the enrichment information may provide information about whether the threat is malicious, whether the threat is safe, or whether the threat is previously unidentified. Once the describing features and enrichment information is obtained, administration system 420 may identify a security action to be taken against the threat. This security action may include blocking an IP address that is malicious, removing a malicious process, monitoring an unknown IP address or process, or some other operation based on defined rules for the enrichment information and describing features.

Here, once the security action is defined, an administrator of the network is provided with credential interface 500 to provide credentials and implement a desired operation. In particular, credential interface 500 includes security action description 510, first credentials 520 corresponding to asset 440, and second credentials 521 corresponding to asset 442. Once the credential interface is provided, the administrator may provide the credentials, including at least a username and password for assets 440 and 442, and transfer the credentials to the corresponding computing assets. Once provided, the assets may determine whether the credentials are accepted for the computing asset, and initiate implementation of the desired security action.

As an illustrative example, security action description 510 may describe blocking a particular IP address for assets 440 and 442. Based on the description, and whether the administration approves of the provided action, the user may provide first credentials 520 and second credentials 521. These credentials may be supplied to assets 440 and 442 and, once supplied, may be processed to determine whether the block IP address security action is accepted. If accepted, the action may be implemented as desired in the computing assets, however, if the credentials are not accepted, the action may be blocked and prevented from being implemented on the desired computing assets. Further, in some examples, if the credentials are not accepted, the asset may return a notification to the administration system indicating the security action could not be completed.

By permitting the administrator to provide the credentials for each of the assets, a single entity is no longer responsible for maintaining credentials for each asset in organization network 430. In particular, by permitting each asset to maintain its own credentials, no central information store can be breached by a malicious entity, permitting the entity access to each asset of network 430. Rather, each of the edge assets maintains their own credentials, ensuring that no single point of failure can be used to access all of the assets.

Figure 6:
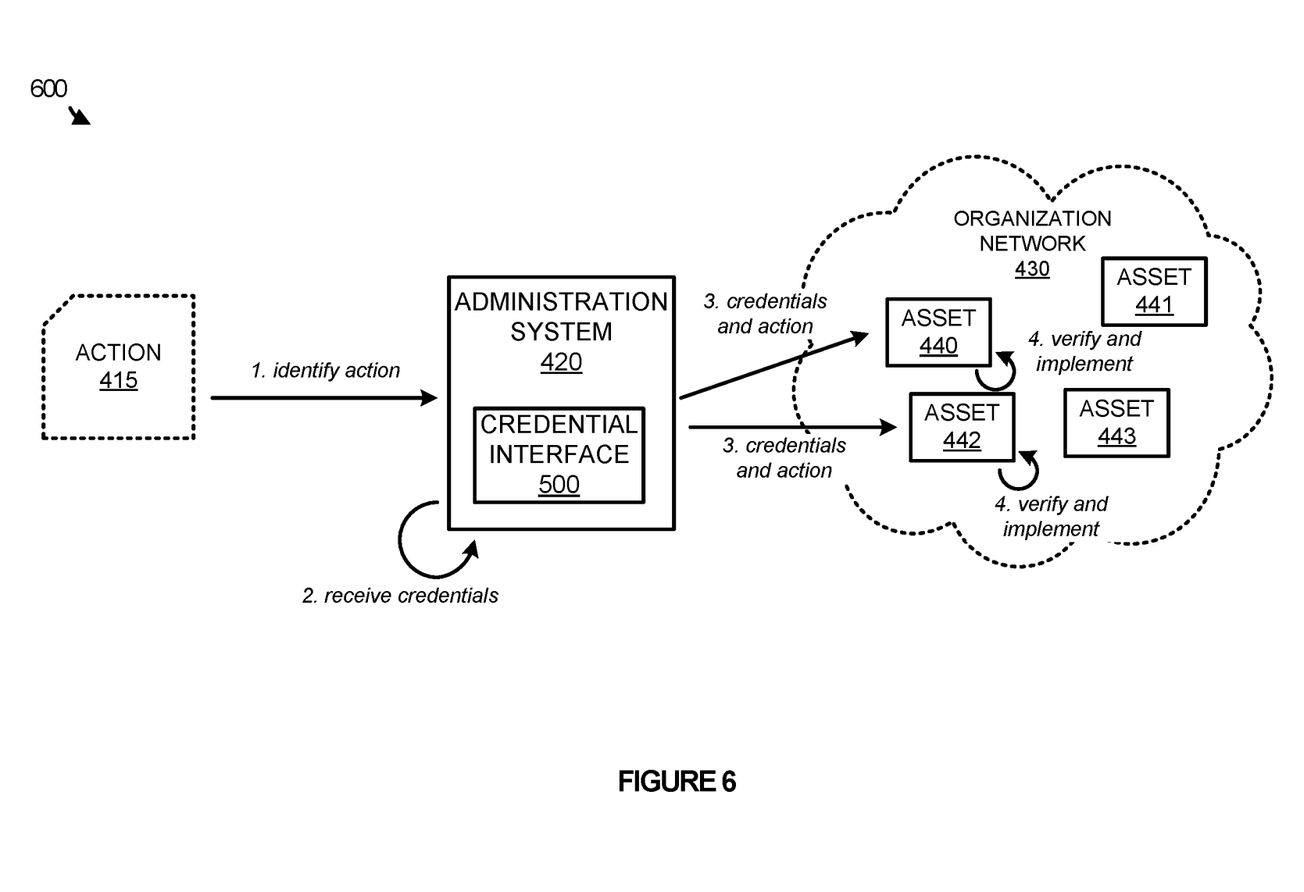
FIG. 6 illustrates an operational scenario of implementing a security action in a computing network according to one implementation.

Referring to FIG. 6, FIG. 6 illustrates an operational scenario 600 of implementing a security action in a computing network according to one implementation. Operational scenario 600 includes systems and elements of system 400 of FIG. 4. In particular, operational scenario 600 includes action 415, administration system 420, and organization network 430.

In operation, at step 1, action 415 is identified by administration system 420. This action may be developed by an administrator of organization network 430, may be developed by an automated operation based on a threat identified in organization network 430, or may be identified in any other similar manor. In at least one implementation, administration system 420 may use descriptor information for a threat and enrichment information obtained from one or more resources to determine the type of threat. Once determined, a security action may be provided to an administrator to be implemented in organization network 430.

In the present implementation, in response to the security action, which is either generated by an automated process or from a user recommendation, credential interface 500 is provided to an administrator. In some implementations, the action may be generated and presented to the user at the same device, however, in other examples, a first administration device may be used to generate the action (such as a server) and provided to an administration console device (computer, smartphone, tablet, and the like) for administrator authorization. Once the credential interface 500 is provided, the administrator, at step 2, provides credentials that are received by administration system 420. These credentials may include, but are not limited to, a username associated with the asset, a password associated with the asset, a passphrase for an asset, or some other similar credential. Once the credentials are received, the credentials and the action may be provided, at step 2 to asset 440 and asset 442.

Asset 440 and 442 may, in response to receiving the information from administration system 420, at step 4, verify that the credentials supplied from the administration system approve the security action and initiate the implementation of the security action on the asset. In some implementations, rather than providing the action with the credentials, the assets may transfer a notification that the action is permitted. Once the notification is received, administration system 420 may transfer the security action to assets 440 and 442.

Although illustrated in the example of FIG. 6 as providing the credentials and the security action together, it should be understood that the credentials may be supplied first to assets 440 and 442 before the action is transferred. Once the credentials are received, assets 440 and 442 may verify the request for the action using the credentials and transfer a notification to administration system 420 for the security action. After being received by the assets, the assets may implement the desired action.

In some examples, assets 440 and 442 may comprise assets from different hardware developers or software manufacturers. Consequently, different operations may be required to implement a desired security action on each of the assets. To provide the action across the various assets in the environment, a unified programming language may be used, such that a single action command can be translated and implemented across multiple assets or devices. This unified security language may comprise Python, C, C++, or some other language that can be used to define security actions across a plurality of assets. This unified language may be translated locally, at the administration system, or may occur in the target computing assets for a particular computing action. For example, a unified command for FIG. 6 may include, "block IP address X on asset 440 and asset 442". Once defined, the hardware and software characteristics for assets 440 and 442 may be identified, and the action may be translated into the necessary procedures for implementing the action on the assets. Accordingly, the action that is transferred from the administration system to the assets may include the unified language, allowing the assets to translate the action into the appropriate processes, or may include the specific operations for each of the individual assets to implement the desired action.

Figure 7:
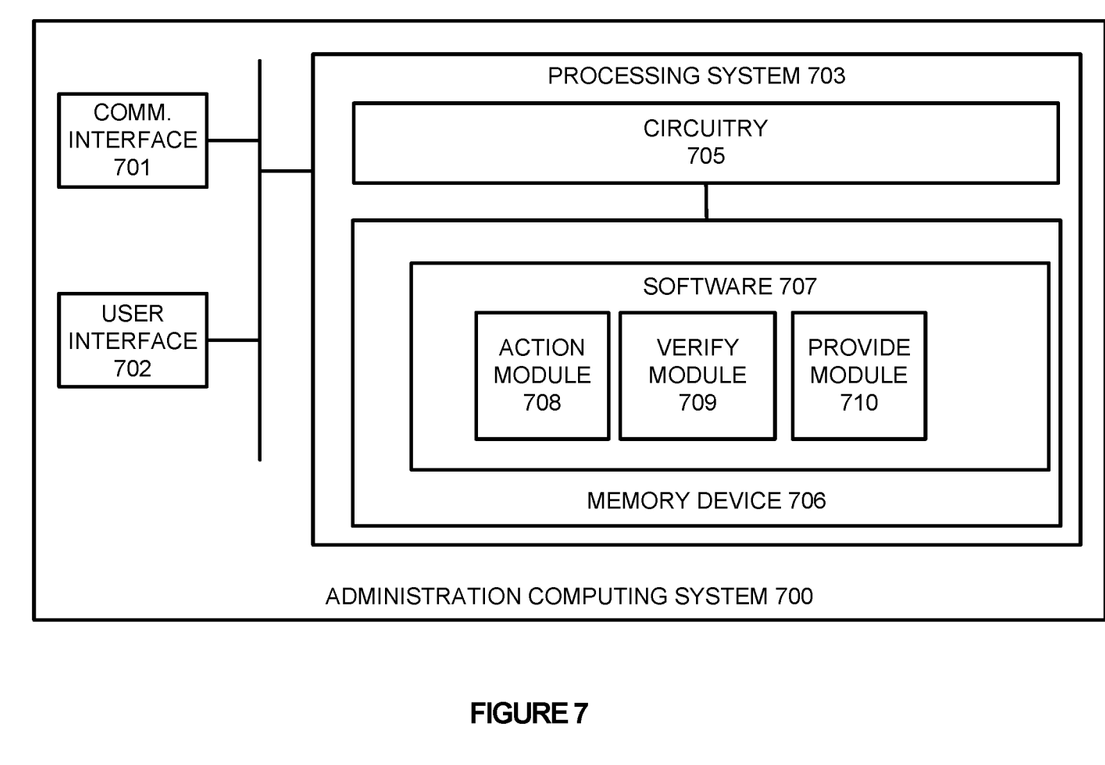
FIG. 7 illustrates an administration computing system to implement security actions according to one implementation.

FIG. 7 illustrates an administration computing system 700 to implement security actions. Administration computing system 700 is representative of a computing system that may be employed in any computing apparatus, system, or device, or collections thereof, to suitably implement the administration systems described herein in FIGS. 1-6. Computing system 700 comprises communication interface 701, user interface 702, and processing system 703. Processing system 703 is communicatively linked to communication interface 701 and user interface 702. Processing system 703 includes processing circuitry 705 and memory device 706 that stores operating software 707.

Communication interface 701 comprises components that communicate over communication links, such as network cards, ports, radio frequency (RF) transceivers, processing circuitry and software, or some other communication devices. Communication interface 701 may be configured to communicate over metallic, wireless, or optical links. Communication interface 701 may be configured to use time-division multiplexing (TDM), IP, Ethernet, optical networking, wireless protocols, communication signaling, or some other communication format—including combinations thereof. In particular, communication interface 701 communicates with a plurality of computing assets in a computing network to implement desired security actions. Further, in some implementations, communication interface 701 may communicate with action sources, such as databases and websites, to retrieve requested security actions.

User interface 702 comprises components that interact with a user. User interface 702 may include a keyboard, display screen, mouse, touch pad, or some other user input/output apparatus. User interface 702 may be configured to receive administrator credentials associated with one or more assets according to one implementation. However, user interface 702 may be omitted in some examples.

Processing circuitry 705 comprises microprocessor and other circuitry that retrieves and executes operating software 707 from memory device 706. Memory device 706 comprises a non-transitory storage medium, such as a disk drive, flash drive, data storage circuitry, or some other memory apparatus. Operating software 707 comprises computer programs, firmware, or some other form of machine-readable processing instructions. Operating software 707 includes action module 708, verify module 709, and provide module 710, although any number of software modules may provide the same operation. Operating software 707 may further include an operating system, utilities, drivers, network interfaces, applications, or some other type of software. When executed by circuitry 705, operating software 707 directs processing system 703 to operate administration computing system 700 as described herein.

In particular, action module 708 directs processing system 703 to identify a security action to be implemented within a computing network. This action may include an action to block a particular IP address in the network, an action to remove a particular process, an action to segregate one or more assets into a virtual local area network (VLAN), or any other security action within the environment. In identifying the action, administration computing system 700 may be configured to receive the action via user interface 702, may be configured to receive the action from a database or second computing system, may be configured to identify the action based on threat characteristics in the computing network and/or enrichment information from external sources, or may identify the action in any other similar manner.

In response to identifying the action, verify module 709 directs processing system 703 to notify, via communication interface 701, relevant computing assets that a security action is to be implemented in the network. Once notified, verify module 709 may exchange security parameters with the relevant computing assets to verify the action and, in some examples, verify administration computing system 700. This verification may include an exchange of passphrases between the administration computing system and the assets, an SSL verification process between the administration computing system and the assets, a digital signature on the action that is sent to the assets, or any other similar verification process for the security action. In at least one example, the exchange may include transferring, via communication interface 701, username, passwords, and other similar information for an administrator to the corresponding computing assets.

Before, during, or after the exchange of the security parameters, provide module 710 directs processing system 703 to transfer the required action operations to the relevant computing assets. In some implementations, the action processes may be transferred to the asset as the notification for the impending action. However, in other implementations, the action processes may only be transferred once the verification is complete with the computing assets. In at least one example, provide module 710 may direct processing system 703 to wait for a verification approval notification from the affected assets prior to transferring the security action commands.

Figure 8:
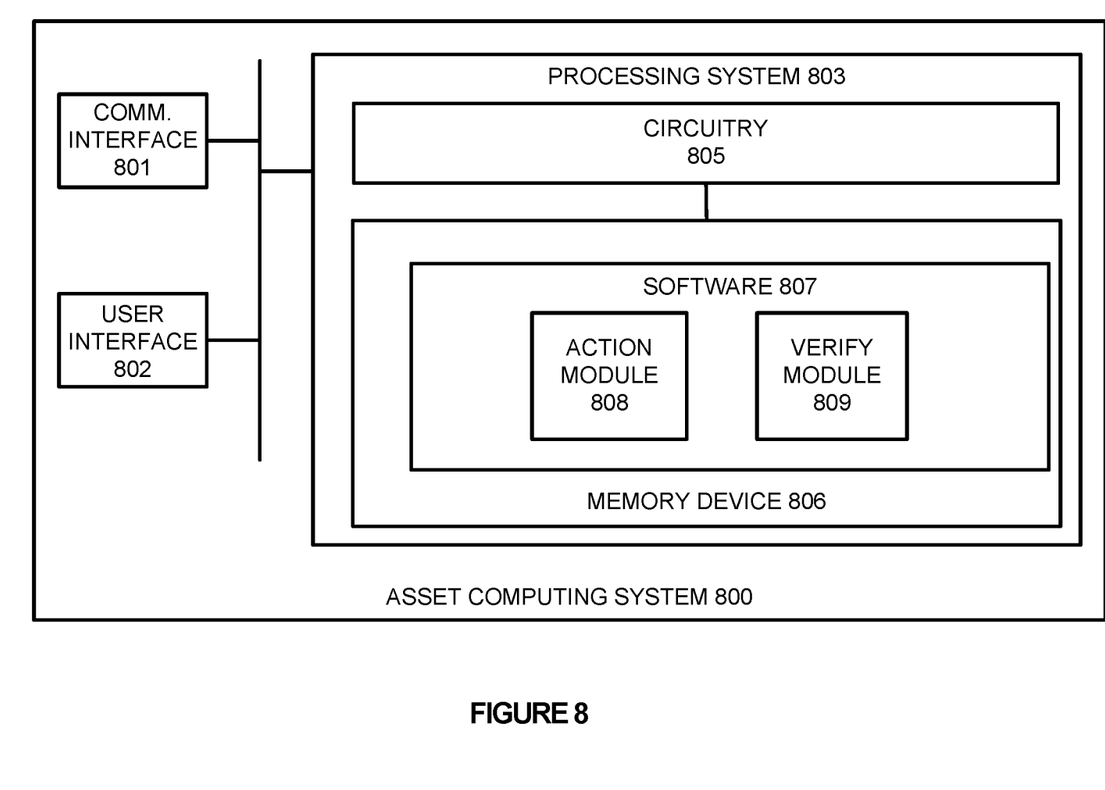
FIG. 8 illustrates an asset computing system to verify security actions prior to implementing the security action according to one implementation.

FIG. 8 illustrates an asset computing system 800 to verify security actions prior to implementing the security action. Asset computing system 800 is representative of a computing system that may be employed in any computing apparatus, system, or device, or collections thereof, to suitably implement the computing assets described herein in FIGS. 1-6. Asset computing system 800 may be an example of a serving computing system, an end user computing system, a switch, a router, or some other similar computing asset described herein. Computing system 800 comprises communication interface 801, user interface 802, and processing system 803. Processing system 803 is communicatively linked to communication interface 801 and user interface 802. Processing system 803 includes processing circuitry 805 and memory device 806 that stores operating software 807.

Communication interface 801 comprises components that communicate over communication links, such as network cards, ports, radio frequency (RF) transceivers, processing circuitry and software, or some other communication devices. Communication interface 801 may be configured to communicate over metallic, wireless, or optical links. Communication interface 801 may be configured to use time-division multiplexing (TDM), IP, Ethernet, optical networking, wireless protocols, communication signaling, or some other communication format—including combinations thereof. In particular, communication interface 801 may communicate with an administration system that provides security actions, and may also communicate with one or more other computing systems within the computing network.

User interface 802 comprises components that interact with a user. User interface 802 may include a keyboard, display screen, mouse, touch pad, or some other user input/output apparatus. User interface 802 may be omitted in some examples.

Processing circuitry 805 comprises microprocessor and other circuitry that retrieves and executes operating software 807 from memory device 806. Memory device 806 comprises a non-transitory storage medium, such as a disk drive, flash drive, data storage circuitry, or some other memory apparatus. Operating software 807 comprises computer programs, firmware, or some other form of machine-readable processing instructions. Operating software 807 includes action module 808 and verify module 809, although any number of software modules may provide the same operation. Operating software 807 may further include an operating system, utilities, drivers, network interfaces, applications, or some other type of software. When executed by circuitry 805, operating software 807 directs processing system 803 to operate asset computing system 800 as described herein.

In particular, asset computing system 800 may operate in a computing network with one or more other computing assets that provide desired operations for a corporation, a partnership, or some other type of organization. During the operation of asset computing system 800, action module 808 directs processing system 803 to identify, or receive via communication interface 801, a notification of an impending security action from an administration system. In response to identifying the security action notification, verify module 809 directs processing system 803 to verify the security action and/or the source of the security action before the action can be implemented within the environment. Once the action and source are identified, asset computing system 800 may initiate an operation to apply the security action.

In some implementations, asset computing system 800 may be communicatively linked to an administration system that can apply security actions to various computing systems. Accordingly, when an action request is received, which in some examples may include the credentials for the action, asset computing system may verify that the action is valid and also verify that the action originated from the administration computing system. To verify the security actions, verify module 809 may be configured to provide an SSL exchange with the requesting action source, may be configured to exchange passphrases with the action source, may be configured to check a digital signature with the security action to authenticate the action, or may provide any other similar check on the security action and the action source, including combinations thereof. In at least one example, administrators of a computing network may be associated with a digital signature, such as a username and password, that can be used to approve security actions on one or more assets before they are implemented in the computing network. As a result, when a security action notification is received, the asset computing system may compare the signature provided with the action with an expected signature from the administrator. If the signature appears valid and the administrator is permitted to configure the asset, then the security action may be implemented within the environment. In contrast, if the signature does not appear valid, the asset computing system may prevent the action from being implemented in the environment.

By performing the validation of the security action and, in some examples, the verification of the administration system, computing assets may prevent improper security actions that may hinder the operations of the computing network or make the network more susceptible to security threats. For example, a computing system may provide an unauthorized security action to a computing asset, allowing a particular IP address improper access to the contents of the security asset. Here, rather than implementing the action, the asset may prevent the action from being taken because the security action would not be verified using the methods described above. Once rejected, a flag or other notification may be created and provided to a defined administrator of the computing network, notifying the administrator that an improper security action was attempted on an asset in the environment. Further, by providing the opportunity to each of the assets to verify the security actions, the verification information may be distributed in the computing network. In particular, rather than maintaining a centralized database with permission information for administrator of a network, the end assets may be used to receive and verify actions before they are implemented, minimizing the opportunity of a breach on a large number of assets.

Returning to the elements of FIG. 1, action sources 110 and administration system 120 may each comprise one or more server computing systems, desktop computing systems, laptop computing systems, virtual machines, or other similar computing systems. Action sources 110 and administration system 120 may each comprise communication interfaces, network interfaces, processing systems, computer systems, microprocessors, storage systems, storage media, or some other processing devices or software systems, and can be distributed among multiple devices. Action sources may include an administrator of the network, and operation executing on administration system 120 to define a security action, an external system configured to provide security actions to administration system 120, or some other similar action source.

Organization network 130 comprises a plurality of assets 140-143. Assets 140-143 may include, but are not limited to, serving computing systems, user computing systems, virtual machines, networking elements, and other similar computing assets, including various combinations thereof.

Administration system 120 may communicate with action sources 110 and organization network 130 using metal, glass, optical, air, space, or some other material as the transport media. Administration system 120 may communicate with action sources 110 and organization network 130 using Time Division Multiplex (TDM), asynchronous transfer mode (ATM), IP, Ethernet, synchronous optical networking (SONET), hybrid fiber-coax (HFC), circuit-switched, communication signaling, wireless communications, or some other communication format, including improvements thereof.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A computer-implemented method comprising:
    identifying a security threat in a computing network monitored by an administration system for instances of security threats;
    identifying a first security action to execute at a first computing asset of the computing network and a second security action to execute at a second computing asset of the computing network, wherein each of the first security action and the second security action are specified using a unified security language supported by the administration system, wherein each of the first security action and the second security action, when executed, mitigates an effect of the security threat in the computing network, and wherein the first security action includes one or more of: blocking an internet protocol (IP) address, removing a process from the first computing asset, segregating the first computing asset from other computing assets in the computing network, or preventing access to the first computing asset by a user;

in response to identifying the first security action to execute at the first computing asset and the second security action to execute at the second computing asset, causing a credential interface to be displayed;

receiving, by the administration system via the credential interface, first credentials associated with the first computing asset, wherein the first computing asset is a first type of computing asset;

receiving, by the administration system via the credential interface, second credentials associated with the second computing asset, wherein the second computing asset is a second type of computing asset that is different from the first type of computing asset;

sending, by the administration system to the first computing asset, a first request to execute the first security action, wherein the first request includes the first credentials associated with the first computing asset;

sending, by the administration system to the second computing asset, a second request to execute the second security action, wherein the second request includes the second credentials associated with the second computing asset;

authorizing, by the first computing asset, the first credentials associated with the first computing asset to enable the first computing asset to determine that the first security action is permitted; and authorizing, by the second computing asset, the second credentials associated with the second computing asset to enable the second computing asset to determine that the second security action is permitted.

2. The method of claim 1, further comprising:

translating, by the administration system, the first security action into a first one or more operations to be performed by the first computing asset, wherein the first security action is translated into the first one or more operations based on the first type of computing asset associated with the first computing asset; and translating, by the administration system, the second security action into a second one or more operations to be performed by the second computing asset, wherein the second security action is translated into the second one or more operations based on the second type of computing asset associated with the second computing asset.

3. The method of claim 1, wherein the first request includes a digital signature identifying the administration system as a source of the first request.

4. The method of claim 1, further comprising:

receiving, by the administration system, input requesting to execute the first security action, wherein the input is associated with a user of the administration system; and generating, by the administration system, a digital signature indicating approval by the user to execute the first security action, wherein the first request includes the digital signature.

5. The method of claim 1, wherein the first security action is identified by the administration system based on a type of the security threat.

6. The method of claim 1, wherein the first credentials include a first username and a first password associated with the first computing asset, and wherein the second credentials include a second username and a second password associated with the second computing asset.

7. The method of claim 1, wherein each of the first computing asset and the second computing asset comprises at least one of: a firewall, a server, an end user computing system, a virtual machine, or a router.

8. The method of claim 1, further comprising receiving, from the first computing asset, a response indicating that the first computing asset successfully executed the first security action using the first credentials.

9. The method of claim 1, further comprising causing display of a graphical user interface including information about the first credentials, the first computing asset, the second credentials, and the second computing asset.

10. A computing device, comprising:

a processor; and a non-transitory computer-readable medium having stored thereon instructions that, when executed by the processor, cause the processor to perform operations including:

identifying a security threat in a computing network monitored by an administration system for instances of security threats;

identifying a first security action to execute at a first computing asset of the computing network and a second security action to execute at a second computing asset of the computing network, wherein each of the first security action and the second security action are specified using a unified security language supported by the administration system, wherein each of the first security action and the second security action, when executed, mitigates an effect of the security threat in the computing network, and wherein the first security action includes one or more of: blocking an internet protocol (IP) address, removing a process from the first computing asset, segregating the first computing asset from other computing assets in the computing network, or preventing access to the first computing asset by a user;

in response to identifying the first security action to execute at the first computing asset and the second security action to execute at the second computing asset, causing a credential interface to be displayed;

receiving, by the administration system via the credential interface, first credentials associated with the first computing asset, wherein the first computing asset is a first type of computing asset;

receiving, by the administration system via the credential interface, second credentials associated with the second computing asset, wherein the second computing asset is a second type of computing asset that is different from the first type of computing asset;

sending, by the administration system to the first computing asset, a first request to execute the first security action, wherein the first request includes the first credentials associated with the first computing asset;

sending, by the administration system to the second computing asset, a second request to execute the second security action, wherein the second request includes the second credentials associated with the second computing asset;

authorizing, by the first computing asset, the first credentials associated with the first computing asset to enable the first computing asset to determine that the first security action is permitted; and authorizing, by the second computing asset, the second credentials associated with the second computing asset to enable the second computing asset to determine that the second security action is permitted.

11. The computing device of claim 10, wherein the instructions, when executed by the processor, further cause the processor to perform operations including:

translating, by the administration system, the first security action into a first one or more operations to be performed by the first computing asset, wherein the first security action is translated into the first one or more operations based on the first type of computing asset associated with the first computing asset; and translating, by the administration system, the second security action into a second one or more operations to be performed by the second computing asset, wherein the second security action is translated into the second one or more operations based on the second type of computing asset associated with the second computing asset.

12. The computing device of claim 10, wherein the first request includes a digital signature identifying the administration system as a source of the first request.

13. The computing device of claim 10, wherein the instructions, when executed by the processor, further cause the processor to perform operations including:

receiving, by the administration system, input requesting to execute the first security action, wherein the input is associated with a user of the administration system; and generating, by the administration system, a digital signature indicating approval by the user to execute the first security action, wherein the first request includes the digital signature.

14. The computing device of claim 10, wherein the first security action is identified by the administration system based on a type of the security threat.

15. A non-transitory computer-readable medium having stored thereon instructions that, when executed by one or more processors, cause the one or more processors to perform operations including:

identifying a security threat in a computing network monitored by an administration system for instances of security threats;

identifying a first security action to execute at a first computing asset of the computing network and a second security action to execute at a second computing asset of the computing network, wherein each of the first security action and the second security action are specified using a unified security language supported by the administration system, wherein each of the first security action and the second security action, when executed, mitigates an effect of the security threat in the computing network, and wherein the first security action includes one or more of: blocking an internet protocol (IP) address, removing a process from the first computing asset, segregating the first computing asset from other computing assets in the computing network, or preventing access to the first computing asset by a user;

in response to identifying the first security action to execute at the first computing asset and the second security action to execute at the second computing asset, causing a credential interface to be displayed;

receiving, by the administration system via the credential interface, first credentials associated with the first computing asset, wherein the first computing asset is a first type of computing asset;

receiving, by the administration system via the credential interface, second credentials associated with the second computing asset, wherein the second computing asset is a second type of computing asset that is different from the first type of computing asset;

sending, by the administration system to the first computing asset, a first request to execute the first security action, wherein the first request includes the first credentials associated with the first computing asset;

sending, by the administration system to the second computing asset, a second request to execute the second security action, wherein the second request includes the second credentials associated with the second computing asset;

authorizing, by the first computing asset, the first credentials associated with the first computing asset to enable the first computing asset to determine that the first security action is permitted; and authorizing, by the second computing asset, the second credentials associated with the second computing asset to enable the second computing asset to determine that the second security action is permitted.

16. The non-transitory computer-readable medium of claim 15, wherein the instructions, when executed by the one or more processors, further cause the one or more processors to perform operations including:

translating, by the administration system, the first security action into a first one or more operations to be performed by the first computing asset, wherein the first security action is translated into the first one or more operations based on the first type of computing asset associated with the first computing asset; and translating, by the administration system, the second security action into a second one or more operations to be performed by the second computing asset, wherein the second security action is translated into the second one or more operations based on the second type of computing asset associated with the second computing asset.

17. The non-transitory computer-readable medium of claim 15, wherein the first request includes a digital signature identifying the administration system as a source of the first request.

18. The non-transitory computer-readable medium of claim 15, wherein the instructions, when executed by the one or more processors, further cause the one or more processors to perform operations including:

receiving, by the administration system, input requesting to execute the first security action, wherein the input is associated with a user of the administration system; and generating, by the administration system, a digital signature indicating approval by the user to execute the first security action, wherein the first request includes the digital signature.

19. The non-transitory computer-readable medium of claim 15, wherein the first security action is identified by the administration system based on a type of the security threat.

20. The non-transitory computer-readable medium of claim 15, wherein the first credentials include a first username and a first password associated with the first computing asset, and wherein the second credentials include a second username and a second password associated with the second computing asset.

\* \* \* \* \*